Dec. 24, 1935.                M. O. FRANTZ                2,025,446
            PEDAL MECHANISM FOR BICYCLES AND THE LIKE
                   Filed April 17, 1935        3 Sheets—Sheet 1
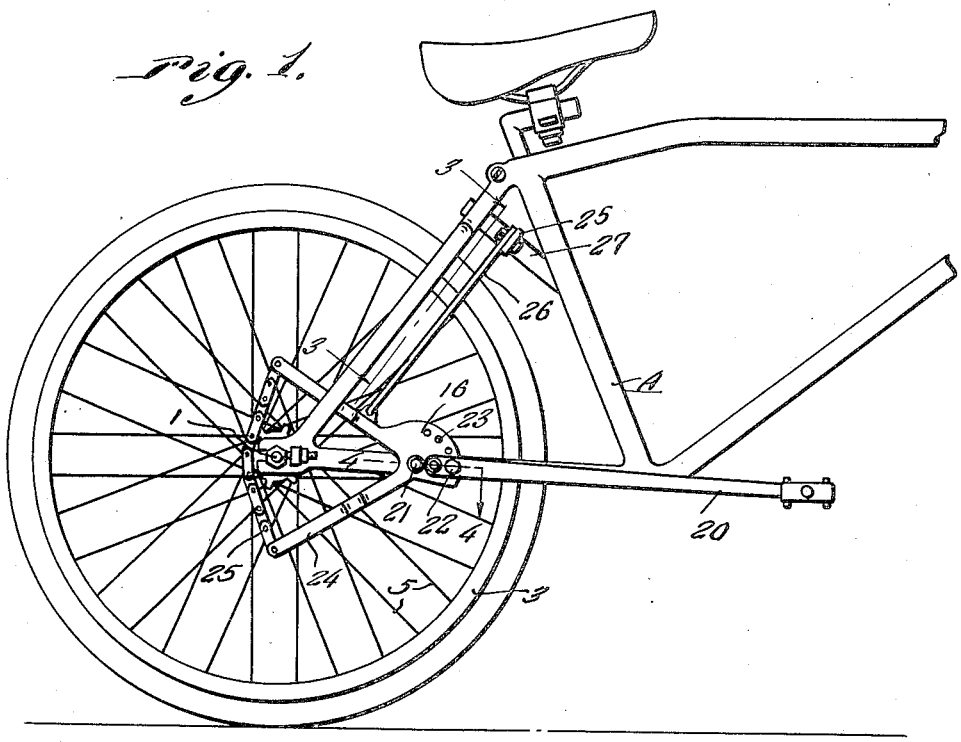
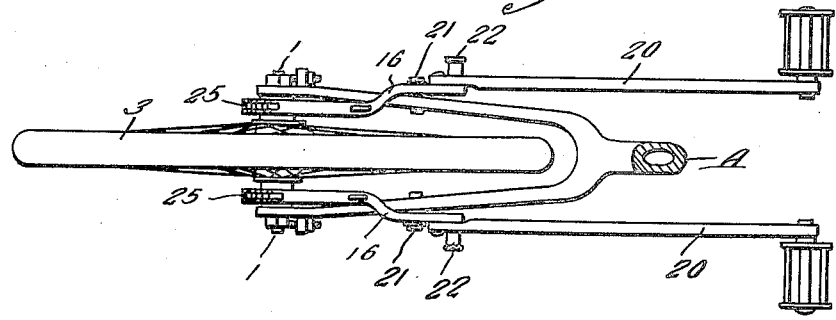
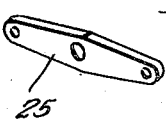
Inventor
M. O. Frantz
By Clarence A. O'Brien
Attorney Dec. 24, 1935.                M. O. FRANTZ                2,025,446
                PEDAL MECHANISM FOR BICYCLES AND THE LIKE
                    Filed April 17, 1935        3 Sheets-Sheet 2
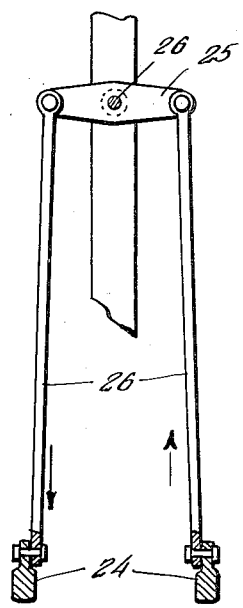
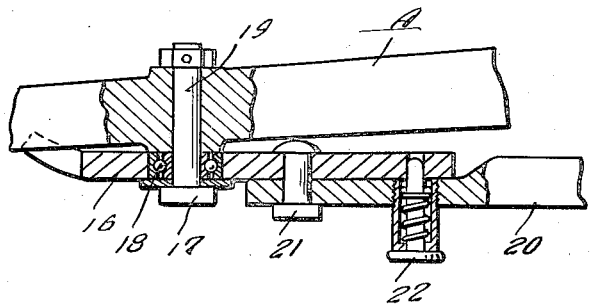
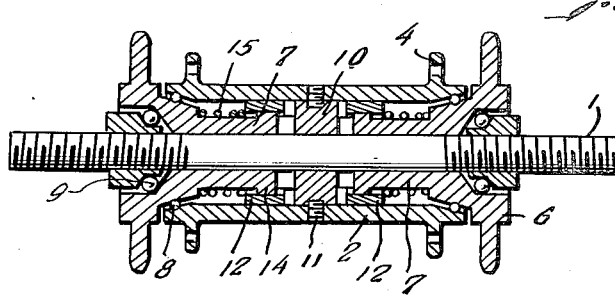
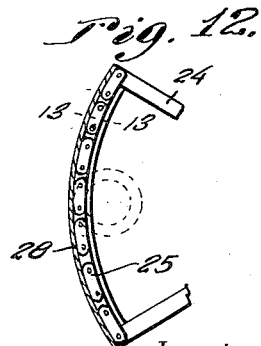
Inventor
M. O. Frantz
By Clarence A. O'Brien
Attorney Dec. 24, 1935. M. O. FRANTZ 2,025,446
PEDAL MECHANISM FOR BICYCLES AND THE LIKE
Filed April 17, 1935   3 Sheets-Sheet 3
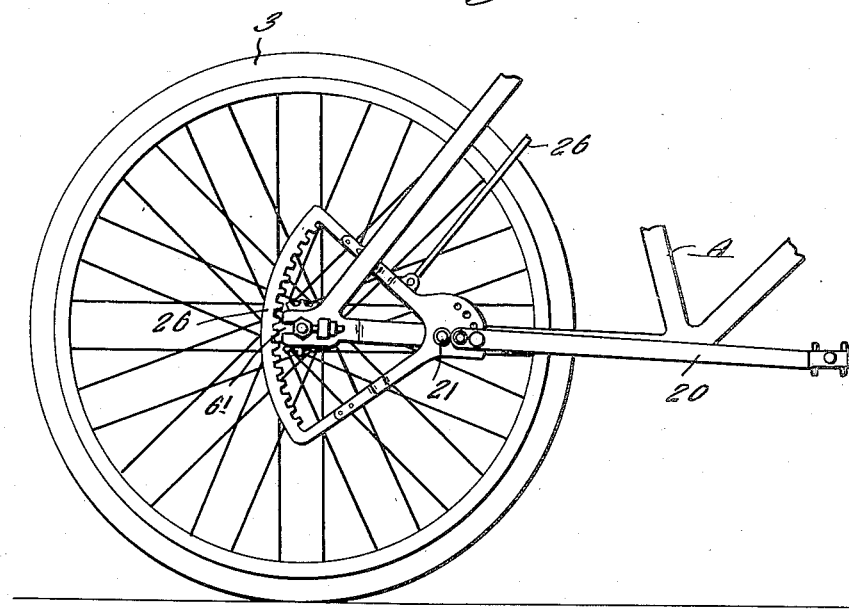
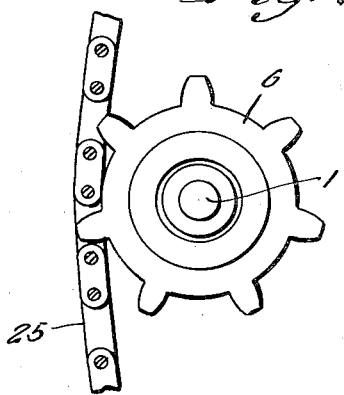
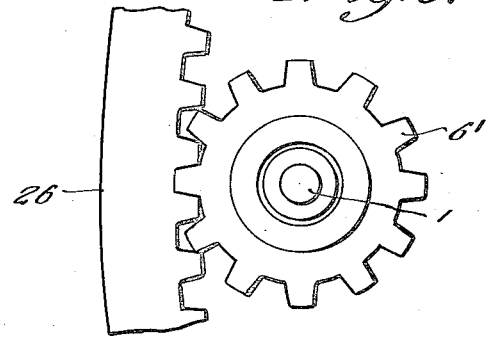
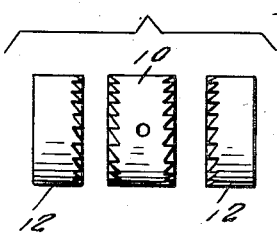
Inventor
M. O. Frantz
By Clarence A O'Brien
Attorney Patented Dec. 24, 1935

2,025,446

UNITED STATES PATENT OFFICE 2,025,446

PEDAL MECHANISM FOR BICYCLES AND THE LIKE

Marvin O. Frantz, Orienta, Okla.

Application April 17, 1935, Serial No. 16,913

3 Claims. (Cl. 208—21)

This invention relates to pedal mechanism for bicycles and the like, the general object of this invention being to provide long leverage which moves only a fraction of the circumference so that all of the force applied is utilized.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation showing the invention applied to a bicycle, only the rear part of the bicycle being shown.

Figure 2 is a top plan view of Figure 1 with the seat and parts of the frame omitted.

Figure 3 is a section on the line 3—3 of Figure 1.

Figure 4 is a section on the line 4—4 of Figure 1.

Figure 5 is a longitudinal sectional view through the hub assembly.

Figure 6 is a view of one of the ratchet rings.

Figure 7 is a view showing how a sprocket engages the chain.

Figure 8 is a view similar to Figure 1 but showing a modification.

Figure 9 is a view showing how the toothed wheel of Figure 8 engages the rack member thereof.

Figure 10 is a perspective view of the lever.

Figure 11 is a view of the ratchet rings of the hub.

Fig. 12 is a sectional view showing a cover for the chain.

Figure 13 is a section on the line 13—13 of Figure 12.

In these drawings the numeral 1 indicates the shaft or axle of a wheel which is supported in a stationary manner from the frame A of the bicycle in any suitable manner. The numeral 2 indicates the hub of the wheel 3 and to the perforated part 4 of which the spokes 5 of the wheel are connected. A pair of sprockets 6 have hub portions 7 extending into the hub 2, the ends of the hub 2 being internally beveled and the hubs 7 of frustroconical shape adjacent these portions and anti-friction bearings 8 are located between such portions as shown in Figure 5. The shaft or axle 1 passes through the sprockets and the hubs, and anti-friction means 9 are located between the sprockets and the shaft or axle 1. A ratchet ring 10 is held in the central part of the hub 2 by the set screw 11 and as shown in Figure 11 both faces of this ring are provided with ratchet teeth and a pair of rings 12 are placed one on each side of the ring 10 and has ratchet teeth in those faces adjacent the ring 10 for meshing with the ratchet teeth of the ring 10. Each ring 12 is provided with keyways 13, as shown in Figure 6 for receiving the keys 14 on the inner ends of the hubs 7 so that the rings 12 can slide on the hubs 7 and must rotate therewith. Each ring 12 is pressed toward the ring 10 by a spring 15.

Thus it will be seen that the ring 10 is attached to the hub 2 and the rotary movement of the sprockets 6 will be communicated to the ring 10 through the rings 12 and therefore the hub 2 and the wheel 3 will be driven when the sprockets are rotated in one direction and the parts will simply ratchet over each other when the sprockets are driven in an opposite direction.

Plates 16 are pivoted to the frame of the device one on each side of the wheel as shown at 17, anti-friction means 18 being placed between the pivots 19 and the plates and a long pedal 20 is pivoted to each plate by a pin 21 and a spring-pressed pin 22 is adapted to engage any one of an arcuate row of holes 23 in the plates so that the pedal can be adjusted on the pin 21 by the pin 22 to suit persons of different heights. Each plate 16 has the rearwardly extending diverging arms 24 to the rear ends of which the chain 25 is connected, each chain passes over a sprocket 6. A link 26 has its lower end pivotally connected to an intermediate part of the upper arm of each pair of arms 24 and the upper ends of the links are connected to the ends of a lever 25 pivoted intermediate its ends as shown at 26 to a bracket 27 at the upper part of the frame. Thus when one pedal is moved downwardly the links 26 and lever 25 move the other lever upwardly so that this lever will be ready to be pushed down by the other leg of the user after he has pushed down the first pedal by the first leg.

Instead of using the chain and sprocket I may provide the toothed wheels 6' in place of the sprockets 6, as shown in Figure 9 and connect an arcuate shaped bar 27 to the rear ends of the arms 24 in place of the chain. As will be seen when one pedal lever moves upward the other one moves downward but when one pedal is depressed and the other moves upwardly the respective sprockets are moved forward and backward.

I provide a channel-shaped cover 28 for the chain, as shown in Figure 12, this cover being of arcuate shape and suitably connected to the ends of the arms 24.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a pedal driven vehicle comprising a wheel having a hub, a ratchet member connected with the hub, a pair of hub members extending into the wheel hub and having ratchet means at the inner ends for engaging the ratchet member, spring means for pressing the ratchet means together, a pair of forked oscillating members connected to the frame of the vehicle located one on one side of the wheel and the other on the opposite side thereof, means connecting the forks of each member together and said means transmitting the oscillating movement to rotary movement of the hub members, a lever hinged to a part of the frame, links connecting the ends of the lever to the oscillating members and pedals connected to the oscillating members for oscillating the same.

2. In a pedal driven vehicle comprising a wheel having a hub, forked oscillating members, means connecting the members to the frame of the vehicle and located one on one side of the wheel and the other on the opposite side thereof, clutch means between said connecting means and the hub, said clutch means including rotary members one rotatable by each of said connecting means incidental to the movement of the oscillating members, a lever hinged to a part of the frame, links connecting the ends of the lever to the oscillating members, and pedals connected to the oscillating members for oscillating the same.

3. In a pedal driven vehicle comprising a wheel having a hub, forked oscillating members, means connecting the members to the frame of the vehicle and located one on one side of the wheel and the other on the opposite side thereof, clutch means between said connecting means and the hub, said clutch means including rotary members one rotatable by each of said connecting means incidental to the movement of the oscillating members; said oscillating members having forward portions in each of which is an arcuate series of transverse apertures, pedals pivotally connected to and extending forwardly from said forward portions of the oscillating members, and spring-pressed pins carried by the pedals and selectively arranged in one of said apertures of the oscillating members to adjustably fix the pedals with respect to the oscillating members.

MARVIN O. FRANTZ.